United States Patent Office 3,284,447
Patented Nov. 8, 1966

3,284,447
IMIDAZOLIDINONESULFONAMIDE
DERIVATIVES
Fuyuki Kusuda, Kyoto-fu, Yoshiharu Matsuo, Kyoto, and Eisuke Seto, Kyoto-fu, Japan, assignors to Nippon Shinyaku Co. Ltd., Kyoto, Japan, a corporation of Japan
No Drawing. Filed Mar. 7, 1966, Ser. No. 532,091
Claims priority, application Japan, Mar. 31, 1965, 40/19,162, 40/19,163
6 Claims. (Cl. 260—239.9)

The present invention relates to imidazolidinonesulfonamide derivatives of the formula:

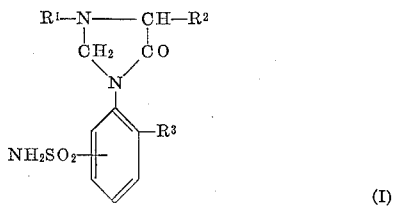

(I)

wherein $R^1$ is lower alkyl and $R^2$ and $R^3$ are each hydrogen or lower alkyl. They are novel compounds hitherto not reported in the literature and useful as chemotherapeutic agents. The new compounds have been found to be particularly valuable as antiphlogistic and analgesic drugs.

The compounds of the present invention are prepared, for example, according to the following reaction scheme in which $R^1$, $R^2$ and $R^3$ have the above meanings:

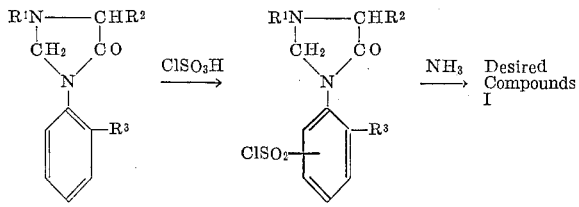

It is recommended to use a large excess of chlorsulfonic acid at −10° to 5° C. in the chlorsulfonation and then to warm to room temperature or to 50–60° C. The chlorsulfonated products are converted into the amides with or without isolation by the use of ammonia (preferably aqueous ammonia). The reaction is conducted more profitably under cooling with ice.

The compounds of the present invention may also be prepared by the reaction of a compound of the formula:

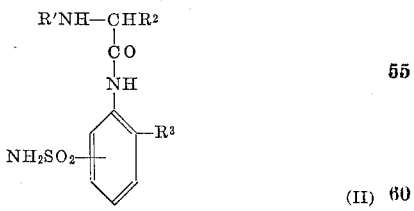

(II)

in which $R^1$, $R^2$ and $R^3$ have the above meanings with formaldehyde. The reaction is preferably conducted in such a suitable solvent as alcohol under refluxing. The reaction time of 3 hours is ordinarily sufficient. Details of the reaction conditions are described in the examples that follow.

In the latter reaction the compounds II may be synthesized, for example, by the following reaction in which $R^1$, $R^2$ and $R^3$ have the above meanings:

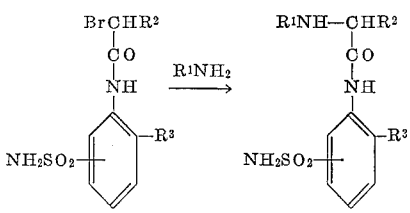

The invention is illustrated by the following non-limitative examples:

EXAMPLE 1

1 - (2 - methyl - 5 - sulfamoylphenyl) - 3 - methyl-imidazolidinone-5 ($R^1=R^3=CH_3$; $R^2=H$; $SO_2NH_2$ is located in the 5-position).

Six grams of N-(2-methyl-5-sulfamoylphenyl)-methylaminoacetamide are dissolved in 35 ml. of ethanol and after addition of 15 g. of 37% formalin, refluxed for 4 hours. The reaction mixture is cooled and evaporated to drive off the solvent and to the residue is added 30 ml. of 7% aqueous ammonia. The crystals that separate are filtered off, washed with water and recrystallized from ethanol to give 4.5 g. of the title compound; M.P. 200–202° C. (decomposition).

Analysis for $C_{11}H_{15}O_3N_3S$.—Calculated: C, 49.07%; H, 5.62%; N, 15.61%. Found: C, 49.31%; H, 5.70%; N, 15.23%.

EXAMPLE 2

1 - (2 - methyl - 5 - sulfamoylphenyl) - 3,4 - dimethyl-imidazolidinone-5 ($R^1=R^2=R^3=CH_3$; $SO_2NH_2$ is located in the 5-position).

Two grams of N - (2 - methyl - 5 - sulfamoylphenyl)-α-methylaminopropionamide are dissolved in 7 ml. of ethanol and allowed to react with 12 g. of 37% formalin in a manner similar to Example 1, and the product is recrystallized from ethanol to obtain the desired compound of M.P. 203–205° C. in the yield of 1 g.

Analysis for $C_{12}H_{17}N_3O_3S \cdot \frac{1}{2}H_2O$.—Calculated: C, 49.40%; H, 6.51%; N, 14.40%. Found: C, 49.68%; H, 6.22%; N, 14.04%.

This compound is also synthesized by the following method: 12 g. of chlorsulfonic acid are chilled to 0–5° C. and after gradual addition of 5 g. of 1-o-tolyl-3,4-dimethylimidazolidinone-5 the mixture is warmed at 50° C. for 10 minutes. After cooling, it is made alkaline with aqueous ammonia with ice-cooling and then allowed to stand overnight. Recrystallization of the crystals that separate from dilute ethanol gives 1.5 g. of the title compound of M.P. 203–205° C.

Analysis for $C_{12}H_{17}N_3O_3S \cdot \frac{1}{2}H_2O$.—Calculated: C, 49.40%; H, 6.51%; N, 14.40%. Found: C, 49.68%; H, 6.22%; N, 14.04%.

EXAMPLE 3

1 - (4 - sulfamoylphenyl) - 3 - methyl - 4 - isopropyl-imidazolidinone-5 ($R^1=CH_3$; $R^2=\text{iso-}C_3H_7$; $R^3=H$; $SO_2NH_2$ is located in the 4-position).

With 29 g. of N-(4-sulfamoylphenyl)-α-methylamino-isovaleroamide, 40 ml. of alcohol and 10 g. of 37% formalin, a reaction is conducted in a manner similar to Example 1 to obtain 2.3 g. of the title compound of M.P. 171–174° C.

Analysis for $C_{13}H_{19}O_3N_3S$.—Calculated: C, 52.50%; H, 6.44%; N, 14.13%. Found: C, 52.67%; H, 6.54%; N, 14.22%.

This compound may also be obtained by the following reaction: Twenty grams of 1-phenyl-3-methyl-4-isopropylimidazolidinone-5 are added in portions to 140 g. of chlorsulfonic acid at 0°–10° C., and when a complete solution is obtained it is warmed at 60° C. for 1 hour. After cooling, it is poured onto ice-water and made alkaline by the addition of aqueous ammonia below 30° C. The crystals that separate on standing overnight are collected by filtration and recrystallized from ethanol to give the title compound in the yield of 13 g.; M.P. 171–174° C.

Analysis for $C_{13}H_{19}O_3N_3S$.—Calculated: C, 52.50%; H, 6.44%; N, 14.13%. Found: C, 52.77%; H, 6.65%; N, 14.24%.

EXAMPLE 4

1-(4-sulfamoylphenyl)-3-methylimidazolidinone ($R^1$=$CH_3$; $R^2$=$R^3$=H; $SO_2NH_2$ is located in the 4-position).

To 50 g. of chlorsulfonic acid which has been maintained at 0° to −10° C. is added in portions 10 g. of 1-phenyl-3-methylimidazolidinone-5. After the addition the mixture is warmed in a water-bath at 50–60° C. for 2 hours and poured onto ice. The aqueous layer is made alkaline under cooling with ice to −3° to 3° C. with aqueous ammonia. The crystals that separate are recrystallized from dilute ethanol to obtain 12 g. of the title compound; M.P. 206–207° C.

Analysis for $C_{10}H_{13}O_3N_3S$.—Calculated: C, 47.06%; H, 5.13%; N, 16.47%. Found: C, 47.42%; H, 5.31%; N, 16.13%.

EXAMPLE 5

1-(4-sulfamoylphenyl)-3-methyl-4-butyl-imidazolidinone-5 ($R^1$=$CH_3$; $R^2$=$C_4H_9$; $R^3$=H; $SO_2NH_2$ is located in the 4-position).

Five grams of 1-phenyl-3-methyl-4-butylimidazolidinone-5 are added in portions and under keeping at −10–0° C. into 40 g. of chlorsulfonic acid. After the addition the mixture is allowed to stand at room temperature overnight and then poured onto ice-water, and made alkaline below 7° C. with aqueous ammonia. The mixture is left at room temperature overnight and the separated crystals are recrystallized from ethanol to give 9.2 g. of the title compound of M.P. 182–182.5° C.

Analysis for $C_{14}H_{21}O_3N_3S$.—Calculated: C, 53.99%; H, 6.79%; N, 13.49%. Found: C, 54.13%; H, 7.06%; N, 13.61%.

*Pharmacological data*

For anti-inflammatory action the suppression rate of the compounds on edema induced by egg white was estimated and the values were compared with those for aminopyrine. Egg white was injected subcutaneously into rats' paws and the volume (A) of the edema there induced was measured. Then the compounds were injected subcutaneously or intraperitoneally and the volume of the edema after the injection was estimated. The value obtained upon dividing $(B-A)$ by A was made the edema suppression rate. Larger values of this rate show that the edema suppressing action and consequently the anti-inflammatory action of the administered compound are large. For the purpose of comparison aminopyrine was administered into the same group of rats and the edema-suppression rate was similarly obtained. The values that were obtained by dividing the edema-suppression rates of compounds of the present invention by the rate of aminopyrine are shown below. The dose administered was 100 mg./kg. for both the new compounds and aminopyrine.

| $R^1$ | $R^2$ | $R^3$ | Position of $SO_2NH_2$ | Edema-suppression Rate of the Compounds/the Rate of Aminopyrine |
|---|---|---|---|---|
| $CH_3$ | i-Pr | H | 4 | 1.57 |
| $CH_3$ | H | H | 4 | 1.74 |
| $CH_3$ | i-Bu | H | 4 | 2.88 |
| $CH_3$ | $CH_3$ | $CH_3$ | 3 | 1.57 |

As these data show, the compounds of the present invention all have distinctive anti-inflammatory action, being more powerful than the action of aminopyrine.

In the next place the analgesic action of these compounds was examined by the modified Haffner method. To groups of mice, one group consisting of 8 heads, morphine in a dose below the threshold amount was previously administered and the new compounds (dose 100 mg./kg.) were injected intraperitoneally. Then pain was applied to the tail and appearance of the analgesic effect was observed. The results are given as follows.

| $R^1$ | $R^2$ | $R^3$ | Position of $SO_2NH_2$ | Analgesic Action (Number of Effective Animals/Number of Used Animals) |
|---|---|---|---|---|
| $CH_3$ | i-Pr | H | 4 | 4/8 |
| $CH_3$ | i-Bu | H | 4 | 4/8 |
| $CH_3$ | $CH_3$ | $CH_3$ | 3 | 4/8 |

It is clear that the new compounds employed showed distinctive analgesic action. In similar experiments with aminopyrine, it was found that 140 mg./kg. is required to afford the same result.

The $LD_{50}$ for mice by intraperitoneal injection are as follows:

| $R^1$ | $R^2$ | $R^3$ | Position of $SO_2NH_2$ | $LD_{50}$ |
|---|---|---|---|---|
| $CH_3$ | i-Pr | H | 4 | 4,000 |
| $CH_3$ | i-Bu | H | 4 | 1,600 |
| $CH_3$ | $CH_3$ | $CH_3$ | 3 | 1,000 |
| Aminopyrine | | | | 260 |

This demonstrates that the compounds according to the present invention are far less toxic than aminopyrine.

What is claimed is:

1. An imidazolidinonesulfonamide derivative of the formula:

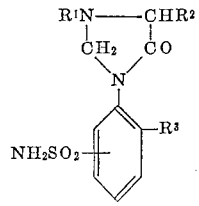

in which $R^1$ is lower alkyl and $R^2$ and $R^3$ are each hydrogen or lower alkyl.

2. The compound 1-(2-methyl-5-sulfamoylphenyl)-3-methylimidazolidinone-5.

3. The compound 1-(2-methyl-5-sulfamoylphenyl)-3,4-dimethylimidazolidinone-5.

4. The compound 1-(4-sulfamoylphenyl)-3-methyl-4-isopropylimidazolidinone-5.

5. The compound 1-(4-sulfamoylphenyl)-3-methylimidazolidinone.

6. The compound 1-(4-sulfamoylphenyl)-3-methyl-4-butylimidazolidinone-5.

No references cited.

JOHN D. RANDOLPH, *Primary Examiner.*